(12) United States Patent
Liu

(10) Patent No.: US 9,244,609 B2
(45) Date of Patent: Jan. 26, 2016

(54) TOUCH CONTROL METHOD AND TOUCH CONTROL ELECTRONIC APPARATUS

(71) Applicant: Wistron Corporation, New Taipei (TW)

(72) Inventor: Wei-Hung Liu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/284,435

(22) Filed: May 22, 2014

(65) Prior Publication Data

US 2015/0116229 A1     Apr. 30, 2015

(30) Foreign Application Priority Data

Oct. 31, 2013   (TW) ............................... 10213960 A

(51) Int. Cl.
*G06F 3/041*     (2006.01)
*G06F 3/0488*    (2013.01)

(52) U.S. Cl.
CPC .......... *G06F 3/04883* (2013.01); *G06F 3/0488* (2013.01)

(58) Field of Classification Search
CPC ... G06F 3/04883; G06F 3/0488; G06F 3/017; G06F 2203/04808
See application file for complete search history.

(56) References Cited

U.S. PATENT DOCUMENTS

2007/0159468 A1    7/2007   Saxby et al.
2012/0200604 A1*   8/2012   Imaeda et al. ................ 345/650
2013/0271430 A1*  10/2013   Nakamura .................... 345/178

\* cited by examiner

*Primary Examiner* — Andrew Sasinowski
(74) *Attorney, Agent, or Firm* — McClure, Qualey & Rodack, LLP

(57) ABSTRACT

A touch control method and a touch control electronic apparatus are provided. The touch control electronic apparatus comprises an angle database, a function database, a touch panel and a central processing unit (CPU). The touch panel senses a plurality of touch points. The CPU calculates a plurality of touch angles according to the touch points, and stores the touch angles to an angle queue. The CPU accesses a comparative model from the angle database, and compares the angle queue with the comparative model to generate a plurality of comparative results. The CPU sequentially stores the comparative results to a comparative queue. The CPU accesses a result queue from the function database, and determines whether the comparative queue matches the result queue. The CPU performs a function operation corresponding to the result queue if the comparative queue matches the result queue.

17 Claims, 7 Drawing Sheets

TOUCH CONTROL METHOD AND TOUCH CONTROL ELECTRONIC APPARATUS

This application claims the benefit of Taiwan application Serial No. 102139600, filed Oct. 31, 2013, the subject matter of which is incorporated herein by reference.

BACKGROUND OF THE INVENTION

1. Field of the Invention

The invention relates in general to an electronic apparatus, and more particularly to a touch control method and a touch control electronic apparatus.

2. Description of the Related Art

Along with the advance in technology, more and more electronic apparatuses use touch panel as standard input/output interface in lieu of conventional key board and mouse. The user can execute touch operations by touching or sliding on the touch panel of an electronic apparatus with finger.

In recent years, multi-touch devices become more and more popular, and are used in more and more application fields. When facing a program interface or frame using dynamic touch control, the user can move, switch or scale the frame through a multi-touch hand gesture operation. However, when facing program interface or frame using static touch control, the user still rely on the window click components provided by the frame. If corresponding window click components are not displayed on the frame, touch operation will not work.

SUMMARY OF THE INVENTION

The invention is directed to a touch control method and a touch control electronic apparatus.

According to one embodiment of the present invention, a touch control method is provided. The touch control method comprises following steps. A plurality of touch points are sensed. A plurality of touch angles are calculated according to the touch points. The touch angles are stored to an angle queue. The angle queue is compared with the comparative model to generate a plurality of comparative results, and the comparative results are sequentially stored to a comparative queue. Whether the comparative queue matches the result queue is determined. A function operation corresponding to the result queue is performed if the comparative queue matches the result queue.

According to another embodiment of the present invention, a touch control electronic apparatus is provided. The touch control electronic apparatus comprises an angle database, a function database, a touch panel and a central processing unit (CPU). The touch panel senses a plurality of touch points. The CPU calculates the touch angles according to the touch points, and stores the touch angles to an angle queue. The CPU accesses a comparative model from the angle database, and compares the angle queue with the comparative model to generate a plurality of comparative results. The CPU sequentially stores the comparative results to a comparative queue. The CPU accesses a result queue from the function database, and determines whether the comparative queue matches the result queue. The CPU performs a function operation corresponding to the result queue when the comparative queue matches the result queue.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
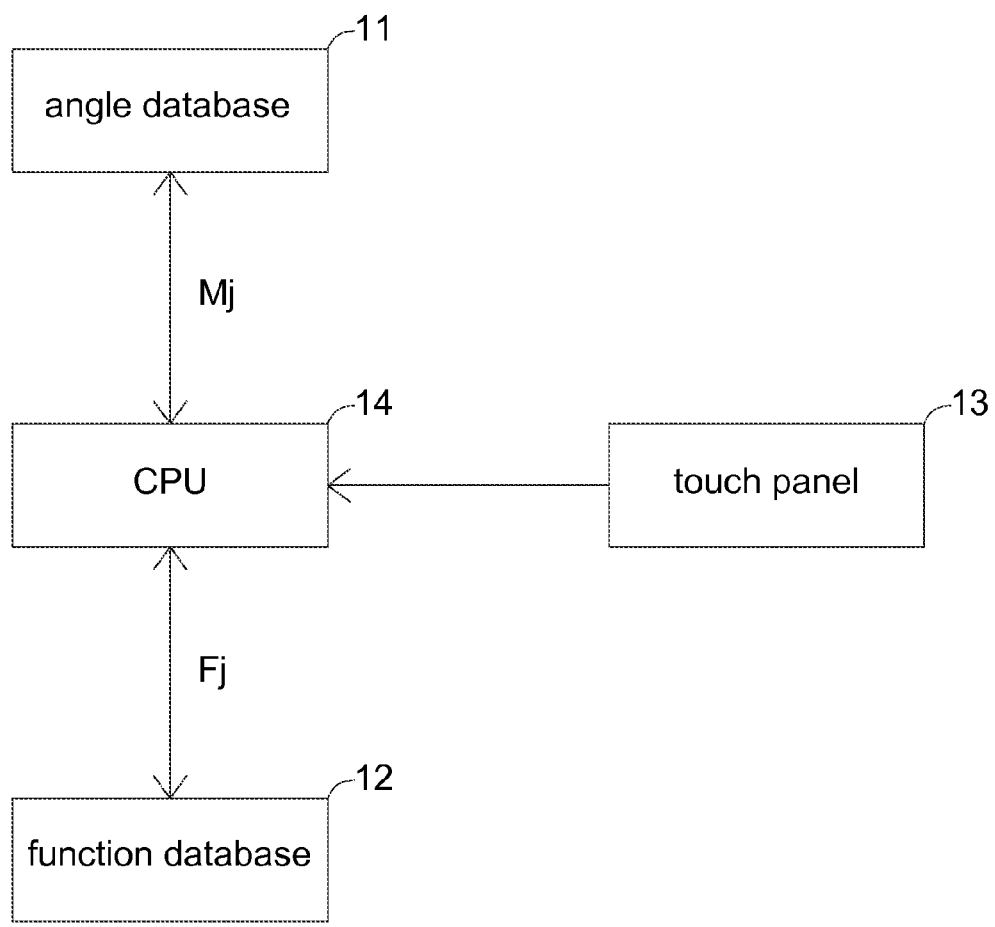
FIG. 1 is a schematic diagram of a touch control electronic apparatus according to the first embodiment.

Referring to FIG. 1, a schematic diagram of a touch control electronic apparatus according to the first embodiment is shown. The touch control electronic apparatus 1 can be realized by a PC tablet or an all-in-one (AIO) computer. The touch control electronic apparatus 1 comprises an angle database 11, a function database 12, a touch panel 13 and a central processing unit (CPU) 14. The angle database 11 and the function database 12 both can be realized by a storage device. The touch panel 13 senses a plurality of touch points. The CPU 14 calculates a touch angle $T(x)$ according to the touch points, and stores the touch angle $T(x)$ to an angle queue Q, wherein the angle queue $Q=\{T(1), T(2), \ldots, T(m)\}$, and $x=1\sim m$. The CPU 14 accesses a comparative model Mj from the angle database 11, and compares the angle queue with the comparative model Mj to generate a comparative result $R(x)$. The comparative model Mj records the comparative angle $A(x)$, wherein the comparative model Mj is expressed as: $Mj=\{A(1), A(2), \ldots, A(m)\}$. The CPU 14 sequentially stores the comparative result $R(x)$ to a comparative queue R, which is expressed as: $R=\{R(1), R(2), \ldots, R(m)\}$. The CPU 14 accesses a result queue C from the function database 12, and determines whether the comparative queue R matches the result queue C. If it is determined that the comparative queue R matches the result queue C, then the polygon formed by the touch points and a predetermined polygon are approximate polygons, and the CPU 14 performs a function operation Fj corresponding to the result queue C. The function operation Fj is such as a pop-up warm boot option, a pop-up work management option or frame unlocking. Given that the touch control electronic apparatus 1 does not display any window click components, the touch control electronic apparatus 1 still can perform the function operation Fj corresponding to the polygon formed according to the touch points, hence largely increasing convenience of use.

Figure 2:
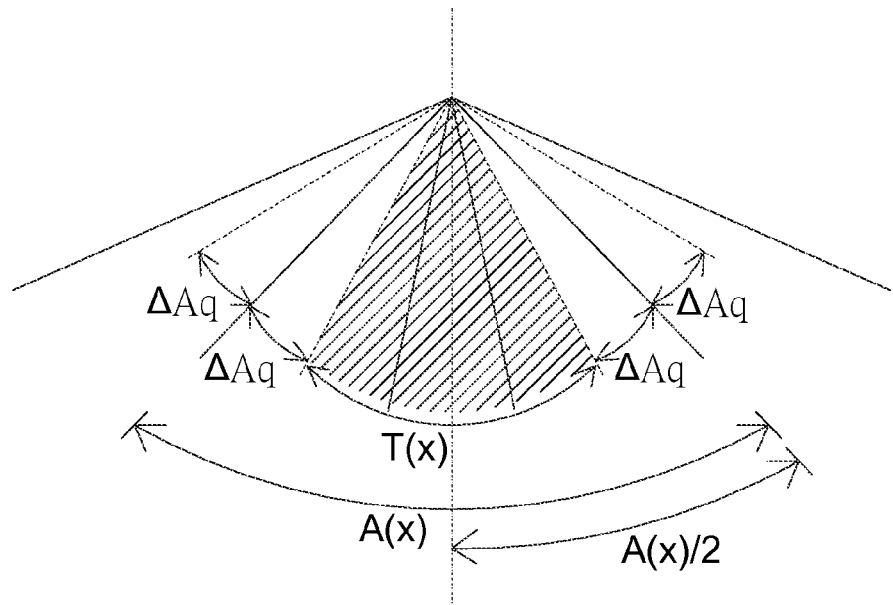
FIG. 2 is a schematic diagram of a touch angle being slightly smaller than a comparative angle.

The comparison between the touch angle $T(x)$ and the comparative angle $A(x)$ can be done by three different methods. The first comparative method is used when the touch angle $T(x)$ is slightly smaller than the comparative angle $A(x)$. The second comparative method is used when the touch angle $T(x)$ approximates the comparative angle $A(x)$. The third comparative method is used when the touch angle $T(x)$ is slightly greater than the comparative angle $A(x)$. Referring to FIG. 1 and FIG. 2. FIG. 2 is a schematic diagram of a touch angle being slightly smaller than a comparative angle. When the inequality $T(x)<A(x)-2\Delta Aq$ holds, it is implied that the touch angle $T(x)$ is slightly smaller than the comparative angle $A(x)$, and the CPU 14 sets the comparative result $R(x)$ as: $R(x)=a$, wherein, $\Delta Aq$ represents an angle comparative error, and a represents a value of the first comparative result.

Figure 3:
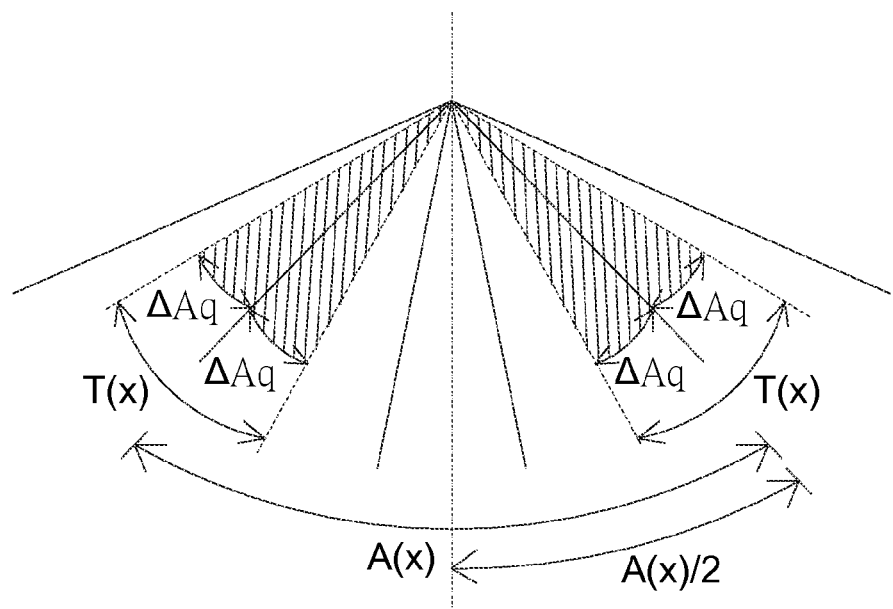
FIG. 3 is a schematic diagram of a touch angle approximating a comparative angle.
Figure 4:
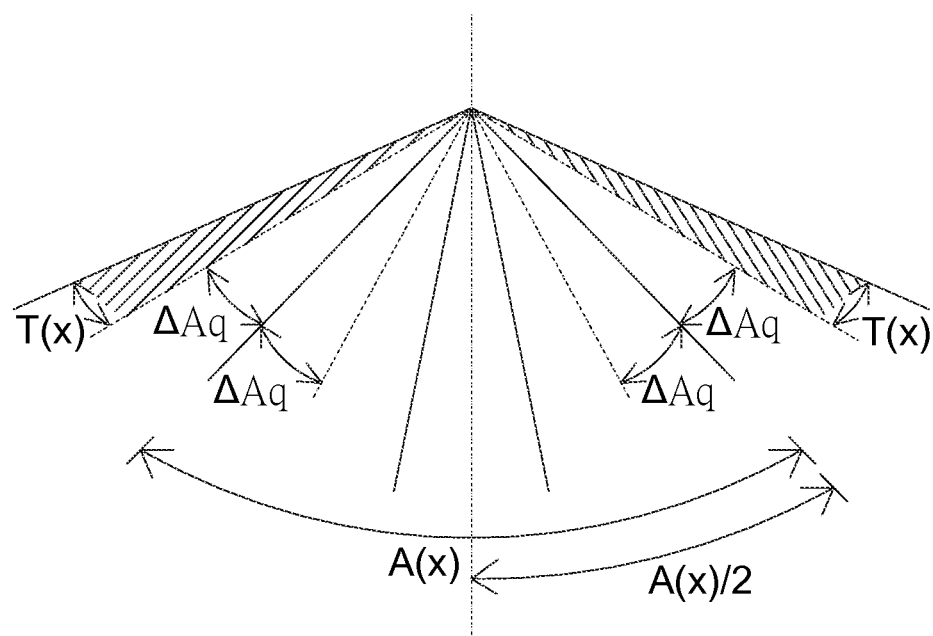
FIG. 4 is a schematic diagram of a touch angle being slightly greater than a comparative angle.

Referring to FIG. 1 and FIG. 3. FIG. 3 is a schematic diagram of a touch angle approximating a comparative angle. When the inequality $(T(x)-A(x))/2|\leq\Delta Aq$ holds, it is implied that the touch angle $T(x)$ approximates the comparative angle $A(x)$, and the CPU 14 sets the comparative result $R(x)$ as: $R(x)=s$, wherein, s represent a value of the second comparative result. Referring to FIG. 1 and FIG. 4. FIG. 4 is a schematic diagram of a touch angle being slightly greater than a comparative angle. When the inequality $T(x)>A(x)+2\Delta Aq$ holds, it is implied that the touch angle $T(x)$ is slightly greater than the comparative angle $A(x)$, and the CPU 14 sets the comparative result $R(x)$ as: $R(x)=b$, wherein, b represent a value of the third comparative result.

Figure 5:
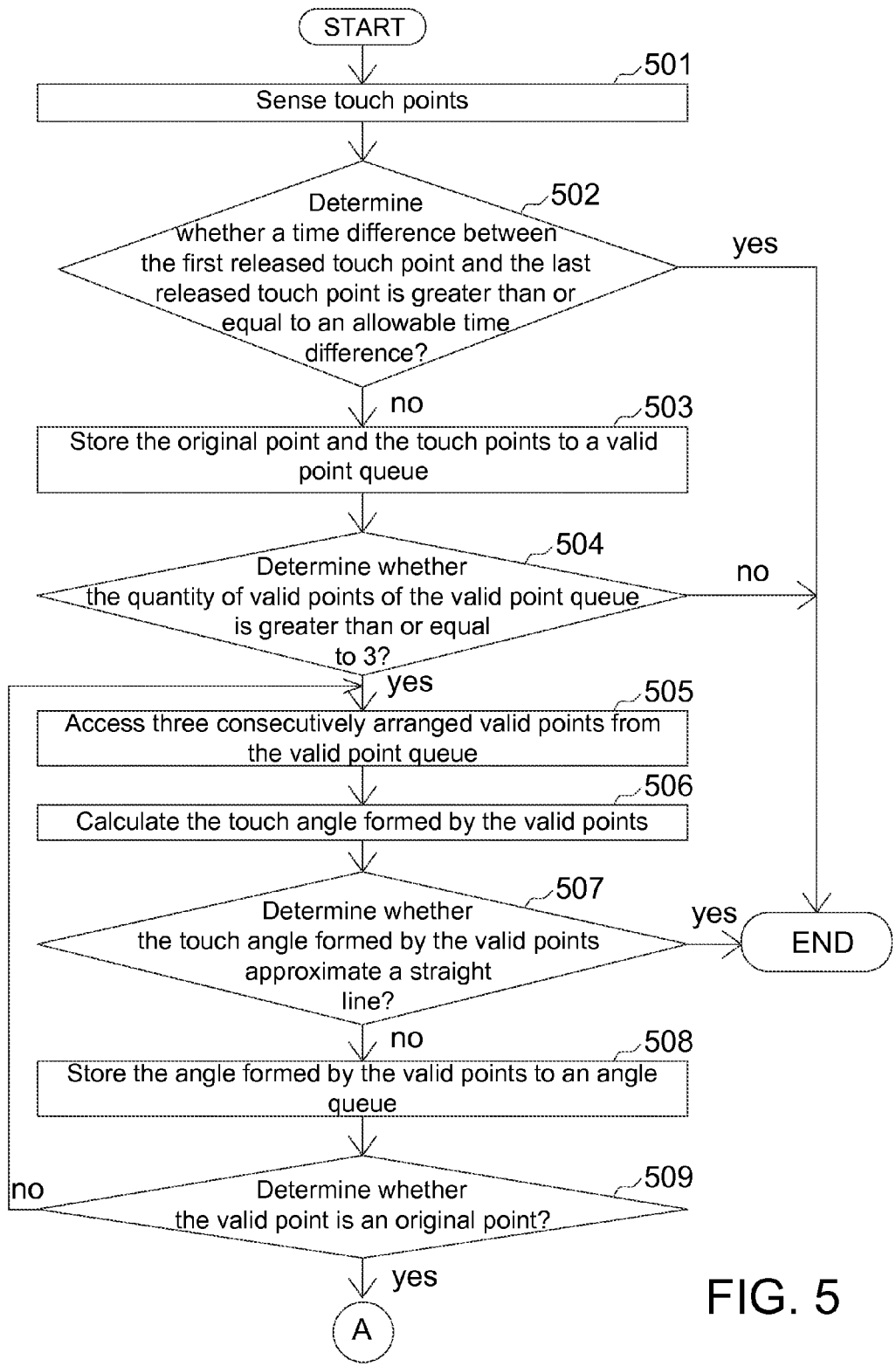
FIG. 5 and FIG. 6 are flowcharts of a touch control method according to a first embodiment.
Figure 6:
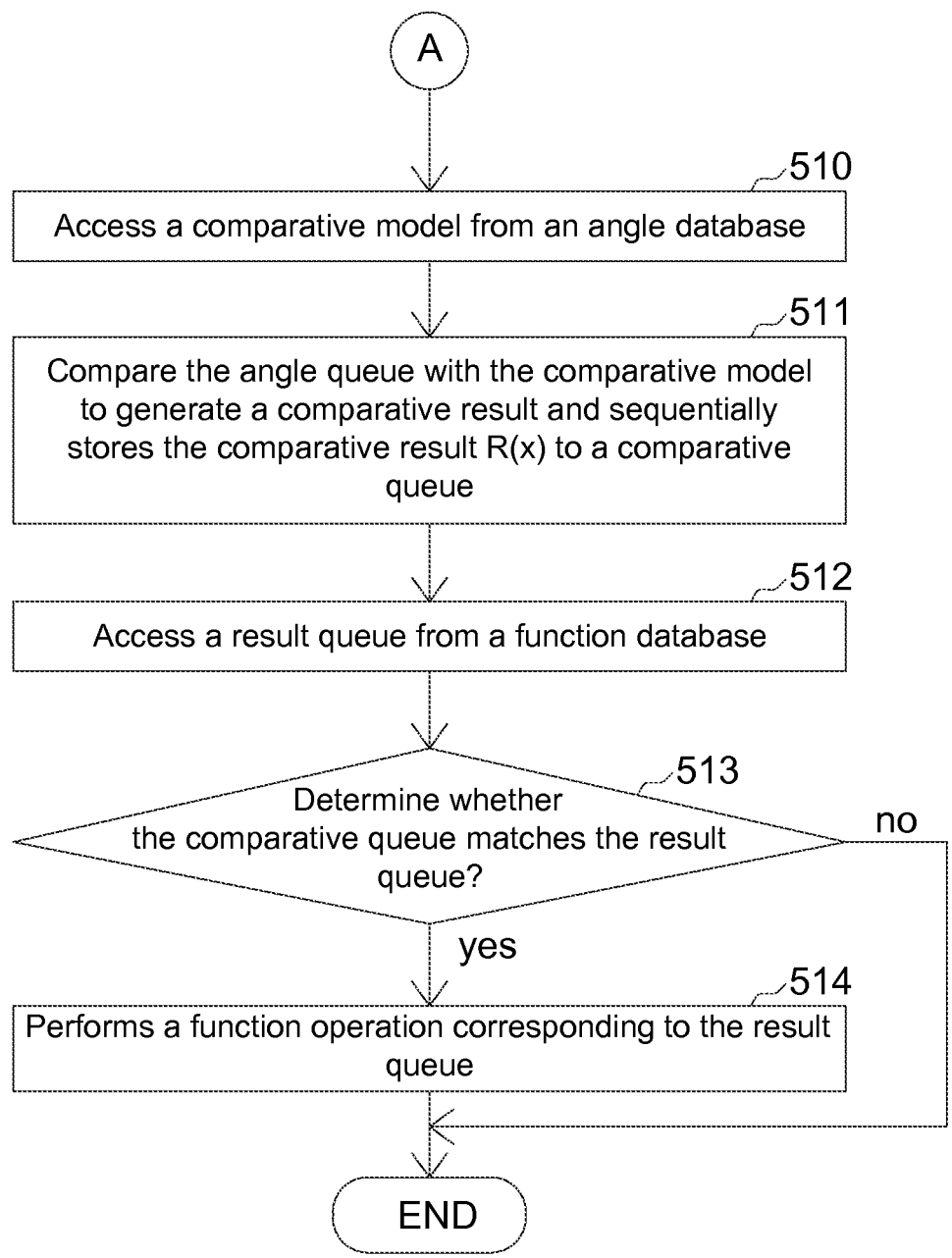

Referring to FIG. 1, FIG. 5 and FIG. 6. FIG. 5 and FIG. 6 are flowcharts of a touch control method according to a first embodiment. Firstly, the method begins at step 501, the touch panel 13 senses a plurality of touch points, wherein the set V of touch points which records the touch point I(i) is expressed as: $V=\{I(1), I(2), \ldots, I(n)\}$, $i=1\sim n$, and the CPU 14 assigns a time mark t(i) corresponding to the touch point I(i). For instance, the CPU 14 assigns a time mark t(1) corresponding to the first released touch point I(1), and the CPU 14 assigns a time mark t(n) corresponding to the last released touch point I(n). The CPU 14 starts to sequentially connect the original point O and the touch points I(1)~I(n) to form a candidate polygon PG which is expressed as: $PG=\{O, I(1), I(2), \ldots, I(n), O\}$.

Next, the method proceeds to step 502, the CPU 14 determines whether a time difference $t(n)-t(1)$ between the first released touch point I(1) and the last released touch point I(n) is smaller than an allowable time difference $\Delta tr$, which can be defined according to the needs in detection. If the time difference $t(n)-t(1)$ is smaller than the allowable time difference $\Delta tr$, it is implied that the first released touch point I(1) and the last released touch point I(n) are almost released at the same time, and the touch control method terminates.

Conversely, if the time difference $t(n)-t(1)$ is not smaller than allowable time difference $\Delta tr$, it is implied that the first released touch point I(1) and the last released touch point I(n) are not released at the same time, and the method proceeds to step 503. In step 503, the CPU 14 defines each point of the candidate polygon PG as a valid point, and stores the original point O and the touch points I(1)~I(n) to a valid point queue P, wherein valid point queue P which records the valid point P(i) is expressed as: $P=\{P(0), P(1), P(2), \ldots, P(n), P(n+1)\}=\{O, I(1), I(2), \ldots, I(n), O\}$, and $i=1\sim n$.

Then, the method proceeds to step 504, the CPU 14 determines whether the quantity of valid points of the valid point queue P is greater than or equal to 3. If the quantity of valid points of the valid point queue P is smaller than 3, then the touch control method terminates. Conversely, if the quantity of valid points is greater than or equal to 3, then the method executes step 505. In step 505, the CPU 14 accesses three consecutively arranged valid points $P_k$, $P_{k+1}$ and $P_{k+2}$ from the valid point queue P, wherein $k=0\sim n$.

Then, the method proceeds to step 506, the CPU 14 respectively defines the valid point $P_k$, the valid point $P_{k+1}$ and the valid point $P_{k+2}$ as the start point, the middle point and the end point, and calculates the touch angle formed by the valid points $P_k$, $P_{k+1}$ and $P_{k+2}$. For instance, the CPU 14 calculates the touch angle formed by the valid point P0, the valid point $P_1$ and the valid point $P_2$. Then, the method proceeds to step 507, the CPU 14 determines whether the touch angle formed by the valid points $P_k$, $P_{k+1}$ and $P_{k+2}$ approximate a straight line. The detection method terminates if the touch angle formed by the valid points $P_k$, $P_{k+1}$ and $P_{k+2}$ approximates straight line. Furthermore, the CPU 14 determines whether the supplementary angle of the touch angle formed by the valid points $P_k$, $P_{k+1}$ and $P_{k+2}$ is smaller than or equal to a maximum collinear allowable angle difference, which is defined according to needs in detection. The touch angle formed by the valid points $P_k$, $P_{k+1}$ and $P_{k+2}$ approximates a straight line if the supplementary angle of the touch angle formed by the valid points $P_k$, $P_{k+1}$ and $P_{k+2}$ is smaller than or equal to a maximum collinear allowable angle difference. Conversely, if the touch angle formed by the valid points $P_k$, $P_{k+1}$ and $P_{k+2}$ do not approximate the straight line, then the method executes step 508.

In step 508, the CPU 14 stores the angle formed by the valid points $P_k$, $P_{k+1}$ and $P_{k+2}$ to an angle queue Q as one of the touch angles $T(1)\sim T(m)$. Then, the method proceeds to step 509, the CPU 14 determines whether the calculation of the touch angles $T(1)\sim T(m)$ is completed. If it is determined that the calculation of the touch angles $T(1)\sim T(m)$ is not completed, then the method repeats step 505. Conversely, if it is determined that the calculation of the touch angles $T(1)\sim T(m)$ is completed, then the method executes step 510. Furthermore, the CPU 14 determines whether original point is a middle point. If the original point is determined as the middle point, it is implied that the calculation of the touch angles $T(1)\sim T(m)$ is completed. In other words, the CPU 14 determines whether the valid point $P_{k+1}$ is an original point. If the valid point $P_{k+1}$ is determined as the original point, it is implied that the calculation of the touch angles $T(1)\sim T(m)$ is completed.

In step 510, the CPU 14 accesses a comparative model Mj from the angle database 11. Then, the method proceeds to step 511, the CPU 14 compares the angle queue with the comparative model Mj to generate a comparative result $R(x)$, and sequentially stores the comparative result $R(x)$ to a comparative queue R. The comparative result $R(x)$ may be set: $R(x)=a$, s, or b, wherein a represents a value of the first comparative result, s represents a value of the second comparative result, and b represents a value of the third comparative result. Then, the method proceeds to step 512, the CPU 14 accesses a result queue C from a function database 12. Then, the method proceeds to step 513, the CPU 14 determines whether the comparative queue R matches the result queue C. If it is determined that the comparative queue R does not match the result queue C, then the touch control method terminates. Conversely, if it is determined that the comparative queue R matches the result queue C, then the method executes step 514. In step 514, the CPU 14 performs a function operation Fj corresponding to the result queue C.

Second Embodiment

Figure 7:
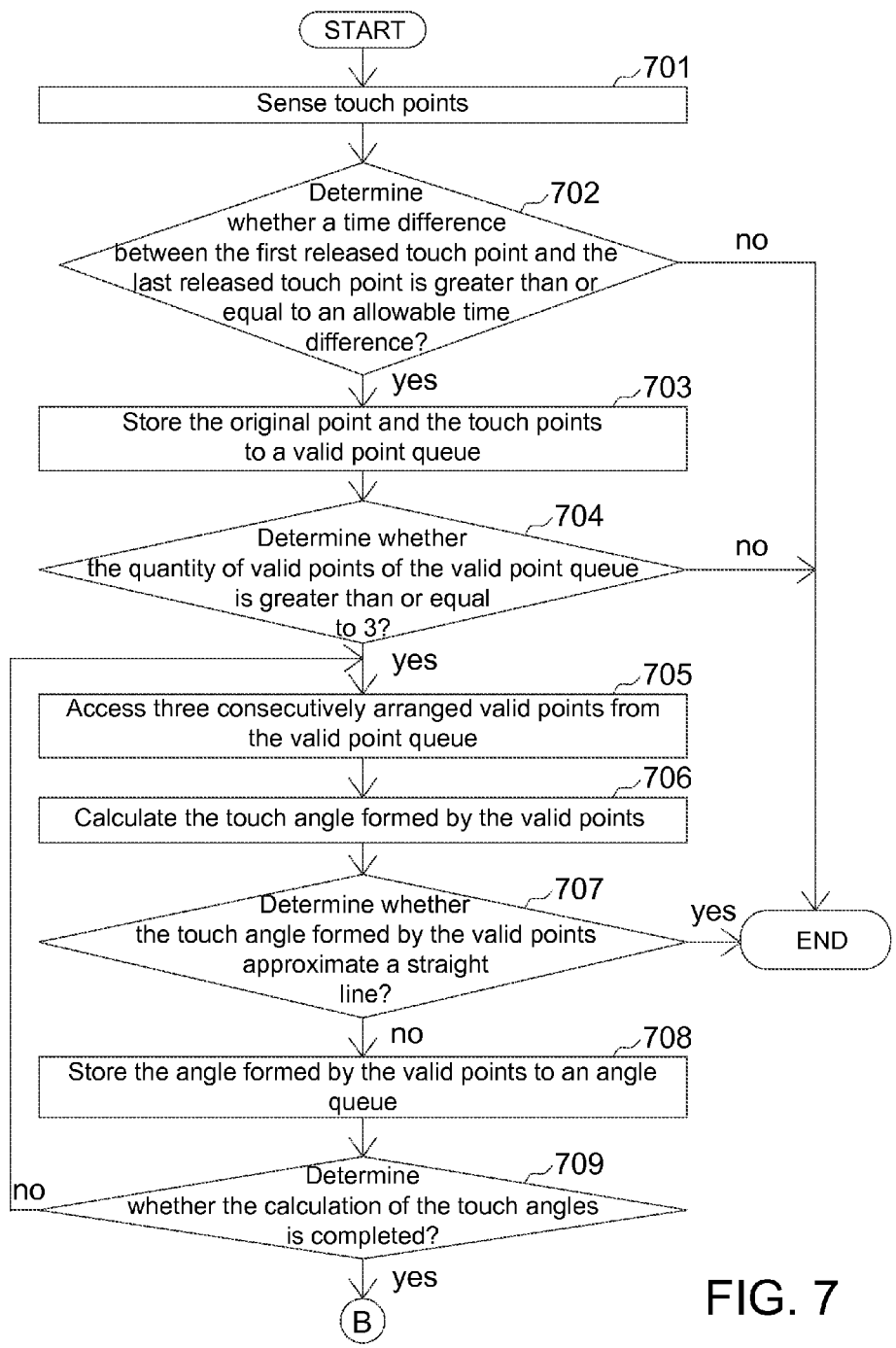
FIG. 7 and FIG. 8 are flowcharts of a touch control method according to a second embodiment.
Figure 8:
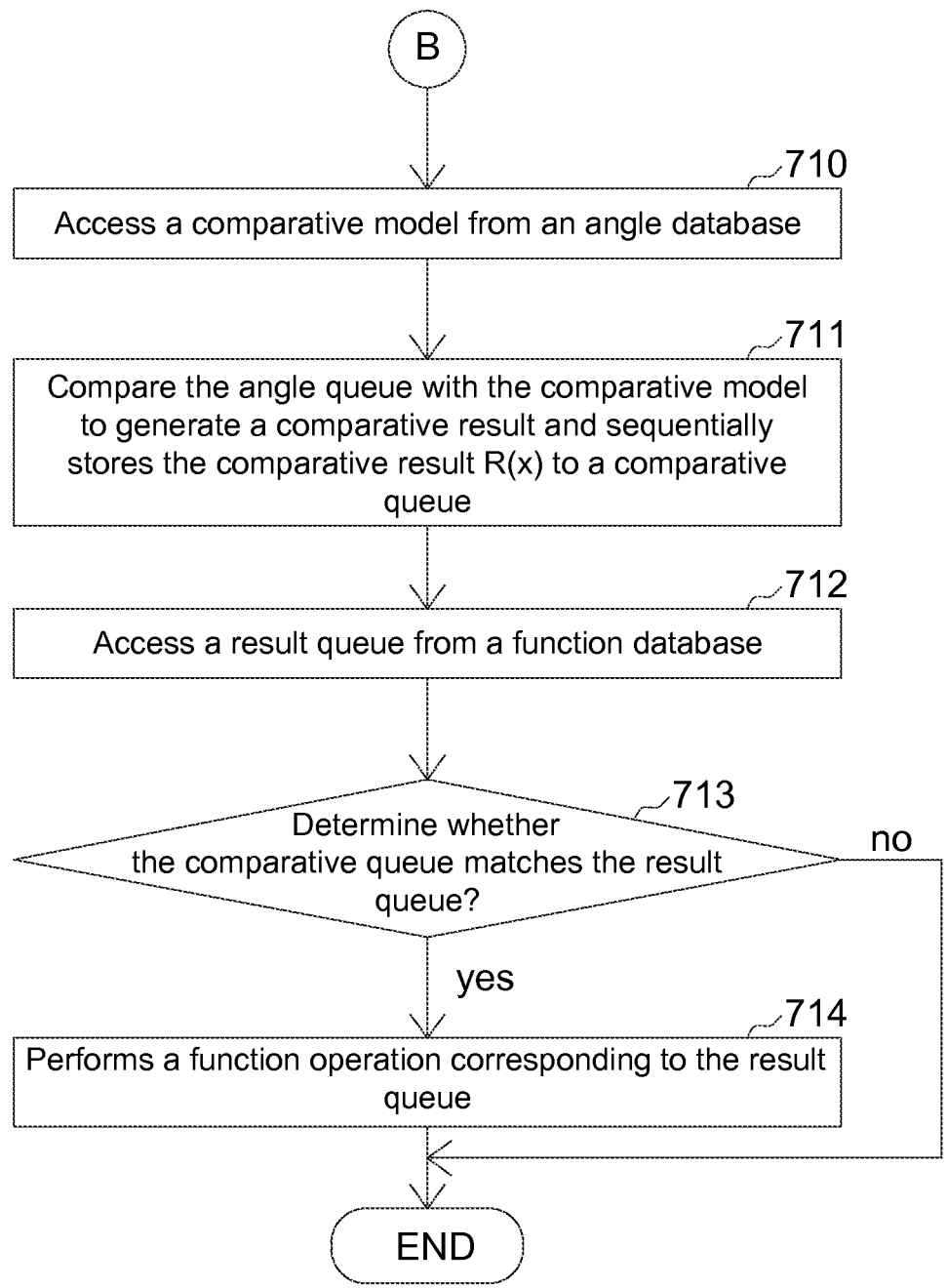

Referring to FIG. 1, FIG. 7 and FIG. 8. FIG. 7 and FIG. 8 are flowcharts of a touch control method according to a second embodiment. The second embodiment is different from the first embodiment mainly in that the first embodiment calculates a plurality of touch angles according to original point and the touch points, but the second embodiment calculates a plurality of touch angles according to the touch points only. Firstly, the method begins at step 701, the touch panel 13 senses a plurality of touch points, wherein the set V of touch points which records the touch point I(i) is expressed as: $V=\{I(1), I(2), \ldots, I(n)\}$, $i=1\sim n$, and the CPU 14 assigns a time mark t(i) corresponding to the touch point I(i). For instance, the CPU 14 assigns a time mark t(1) corresponding to the first released touch point I(1), and the CPU 14 assigns a time mark t(n) corresponding to the last released touch point I(n). The CPU 14 sequentially connects the touch points I(1)~I(n) to form a candidate polygon PG, which is expressed as: PG={I(1), I(2), . . . , I(n)}.

Then, the method proceeds to step 702, the CPU 14 determines whether a time difference t(n)−t(1) between the first released touch point I(1) and the last released touch point I(n) is greater than or equal to an allowable time difference Δtr, which can be defined according to the needs in detection. If the time difference t(n)−t(1) is smaller than the allowable time difference Δtr, it is implied that the first released touch point I(1) and the last released touch point I(n) almost are released at the same time, and the touch control method terminates.

Conversely, if the time difference t(n)−t(1) is greater than or equal to the allowable time difference Δtr, it is implied that the first released touch point I(1) and the last released touch point I(n) are not released at the same time, and the method proceeds to step 703. In step 703, the CPU 14 defines each point of the candidate polygon PG as a valid point, and stores the touch points I(1), the touch points I(2), . . . and the touch points I(n) to a valid point queue P, wherein the valid point queue P which records the valid point P(i) is expressed as: P={P(1), P(2), . . . , P(n)}, and i=1~n.

Then, the method proceeds to step 704, the CPU 14 determines whether the quantity of valid points of the valid point queue P is greater than or equal to 3. If the quantity of valid points of the valid point queue P is smaller than 3, then the touch control method terminates. Conversely, if the quantity of valid points is greater than or equal to 3, then the method executes step 705. In step 705, the CPU 14 accesses three consecutively arranged valid points $P_k$, $P_{k+1}$ and $P_{k+2}$ from the valid point queue P, wherein k=0~n.

Then, the method proceeds to step 506, the CPU 14 respectively defines the valid point $P_k$, the valid point $P_{k+1}$ and the valid point $P_{k+2}$ as the start point, the middle point and the end point, and calculates the touch angle formed by the valid points $P_k$, $P_{k+1}$ and $P_{k+2}$. For instance, the CPU 14 calculates the touch angle formed by the valid point $P_1$, the valid point $P_2$ and the valid point $P_3$. Then, the method proceeds to step 707, the CPU 14 determines whether the touch angle formed by the valid point $P_k$, $P_{k+1}$ and $P_{k+2}$ approximate a straight line. If the touch angle formed by the valid points $P_k$, $P_{k+1}$ and $P_{k+2}$ approximate the straight line, then the detection method terminates. Furthermore, the CPU 14 determines whether the supplementary angle of the touch angle formed by the valid points $P_k$, $P_{k+1}$ and $P_{k+2}$ is smaller than or equal to a maximum collinear allowable angle difference, which can be defined according to needs in detection. If the supplementary angle of the touch angle formed by the valid points $P_k$, $P_{k+1}$ and $P_{k+2}$ is smaller than or equal to the maximum collinear allowable angle difference, then the touch angle formed by the valid point $P_k$, the valid point $P_{k+1}$ and the valid point $P_{k+2}$ approximates a straight line. Conversely, if the touch angle formed by the valid points $P_k$, $P_{k+1}$ and $P_{k+2}$ do not approximate the straight line, then the method executes step 508.

In step 708, the CPU 14 stores the angle formed by the valid point $P_k$, the valid point $P_{k+1}$ and the valid point $P_{k+2}$ to an angle queue Q as one of the touch angles T(1)~T(m). Then, the method proceeds to step 709, the CPU 14 determines whether the calculation of the touch angles T(1)~T(m) is completed. If it is determined that the calculation of the touch angles T(1)~T(m) is not completed, then the method repeats step 705. Conversely, if it is determined that the calculation of the touch angles T(1)~T(m) is completed, then the method executes step 710.

In step 710, the CPU 14 accesses a comparative model Mj from the angle database 11. Then, the method proceeds to step 711, the CPU 14 compares the angle queue with the comparative model Mj to generate a comparative result R(x), and sequentially stores the comparative result R(x) to a comparative queue R. The comparative result R(x) may be set: R(x)=a, s, or b, wherein a represents a value of the first comparative result, s represents a value of the second comparative result, and b represents a value of the third comparative result. Then, the method proceeds to step 712, the CPU 14 accesses a result queue C from the function database 12. Then, the method proceeds to step 713, the CPU 14 determines whether the comparative queue R matches the result queue C. If it is determined that the comparative queue R does not match the result queue C, then the touch control method terminates. Conversely, if it is determined that the comparative queue R matches the result queue C, then the method executes step 714. In step 714, the CPU 14 performs a function operation Fj corresponding to the result queue C.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch control method, comprising:
   sensing a plurality of touch points;
   calculating a plurality of touch angles according to the touch points;
   storing the touch angles to an angle queue;
   comparing the angle queue with a comparative model to generate a plurality of comparative results, and sequentially storing the comparative results to a comparative queue;
   determining whether the comparative queue matches a result queue accessed from a database; and
   performing a function operation corresponding to the result queue if the comparative queue matches the result queue.

2. The touch control method according to claim 1, wherein in the step of calculating the touch angles, the touch angles are calculated according to an original point and the touch points.

3. The touch control method according to claim 2, wherein the touch points comprise a first released touch point and a last released touch point, and the step of calculating the touch angles further comprises:
   determining whether a time difference between the first released touch point and the last released touch point is greater than or equal to an allowable time difference;
   an original point and the touch points are stored to a valid point queue if the time difference between the first released touch point and the last released touch point is greater than or equal to the allowable time difference;
   determining whether a quantity of valid points of the valid point queue is greater than or equal to 3;
   accessing three consecutively arranged valid points, namely, first valid point, second valid point and third valid point, from the valid point queue if the quantity of valid points is greater than or equal to 3;
   calculating the touch angle formed by the first, second and third valid points;
   determining whether the touch angle formed by the first, second and third valid points approximate a straight line; and
   storing the touch angle formed by the first, second and third valid points to the angle queue as one of the touch angles if the touch angle formed by the first, second and third valid points do not approximate the straight line.

4. The touch control method according to claim 3, further comprising:
determining whether the calculation of the touch angles is completed;
wherein, the angle queue is compared with the comparative model if the calculation of the touch angles is completed.

5. The touch control method according to claim 4, wherein in the step of determining whether the calculation is completed, whether the second valid point is the original point is determined, and it is determined that the calculation of the touch angles is completed if the second valid point is the original point.

6. The touch control method according to claim 5, wherein when $T(x)<A(x)-2\Delta Aq$, the comparative result $R(x)$ is set as: $R(x)=a$, wherein, $T(x)$ represents an x-th touch angle of the touch angles, $A(x)$ represents an x-th touch angle of the comparative angles, $\Delta Aq$ represents an angle comparative error, $R(x)$ represents an x-th comparative result of the comparative results, and a represents a value of the first comparative result.

7. The touch control method according to claim 5, wherein when $|(T(x)-A(x))/2|\leq \Delta Aq$, the comparative result $R(x)$ is set as: $R(x)=s$, wherein, $R(x)$ represents an x-th comparative result, $T(x)$ represents an x-th touch angle of the touch angles, $A(x)$ represents an x-th comparative angle of the comparative angles, $\Delta Aq$ represents an angle comparative error, $R(x)$ represents an x-th comparative result of the comparative results, and s represent a value of the second comparative result.

8. The touch control method according to claim 5, wherein when $T(x)>A(x)+2\Delta Aq$, the comparative result $R(x)$ is set as: $R(x)=b$, wherein $T(x)$ represents an x-th touch angle of the touch angles, $A(x)$ represents an x-th comparative angle of the comparative angles, $\Delta Aq$ represents an angle comparative error, $R(x)$ represents an x-th comparative result of the comparative results, and b represent a value of the third comparative result.

9. The touch control method according to claim 1, further comprising
accessing the comparative model from an angle database; and
accessing the result queue from a function database.

10. A touch control electronic apparatus, comprising:
an angle database;
a function database;
a touch panel for sensing a plurality of touch points; and
a central processing unit (CPU) for calculating a plurality of touch angles according to the touch points, and storing the touch angles to an angle queue, wherein the CPU accesses a comparative model from the angle database and compares the angle queue with the comparative model to generate a plurality of comparative results, the CPU sequentially stores the comparative results to a comparative queue, accesses a result queue from the function database and determines whether the comparative queue matches the result queue, and the CPU further performs a function operation corresponding to the result queue if the comparative queue matches the result queue.

11. The touch control electronic apparatus according to claim 10, wherein the CPU calculates a plurality of touch angles according to an original point and the touch points.

12. The touch control electronic apparatus according to claim 11, wherein the touch points comprise a first released touch point and a last released touch point, the CPU determines whether a time difference between the first released touch point and the last released touch point is greater than or equal to an allowable time difference, and stores an original point and the touch points to a valid point queue according to a release order if the time difference between the first released touch point and the last released touch point is greater than or equal to the allowable time difference, the CPU determines whether a quantity of elements of the valid point queue is greater than or equal to 3, and if the quantity of elements is greater than or equal to 3, the CPU accesses three consecutively arranged valid points, namely, first valid point, second valid point and third valid point, from the valid point queue, and calculates the touch angle formed by the first, second and third valid points, the CPU determines whether the touch angle formed by the first, second and third valid points approximate a straight line, and if the touch angle formed by the first, second and third valid points do not approximate the straight line, the CPU stores the touch angle formed by the first, second and third valid points to the angle queue as one of the touch angles.

13. The touch control electronic apparatus according to claim 12, wherein the CPU further determines whether the calculation of the touch angles is completed, and the CPU compares the angle queue with the comparative model if the calculation of the touch angles is completed.

14. The touch control electronic apparatus according to claim 13, wherein the CPU determines whether the second valid point is the original point, and it is determined that the calculation of the touch angles is completed if the second valid point is the original point.

15. The touch control electronic apparatus according to claim 14, wherein when $T(x)<A(x)-2\Delta Aq$, the CPU sets the comparative result $R(x)$ as: $R(x)=a$, wherein, $T(x)$ represents an x-th touch angle of the touch angles, $A(x)$ represents an x-th touch angle of the comparative angles, $\Delta Aq$ represents an angle comparative error, $R(x)$ represents an x-th comparative result of the comparative results, and a represents a value of the first comparative result.

16. The touch control electronic apparatus according to claim 14, wherein when $|(T(x)-A(x))/2|\leq \Delta Aq$, the CPU sets the comparative result $R(x)$ as: $R(x)=s$, wherein, $T(x)$ represents an x-th touch angle of the touch angles, $A(x)$ represents an x-th comparative angle of the comparative angles, $\Delta Aq$ represents an angle comparative error, $R(x)$ represents an x-th comparative result of the comparative results, and s represent a value of the second comparative result.

17. The touch control electronic apparatus according to claim 14, wherein when $T(x)>A(x)+2\Delta Aq$, the CPU sets the comparative result $R(x)$ as: $R(x)=b$, wherein, $T(x)$ represents an x-th touch angle of the touch angles, $A(x)$ represents an x-th comparative angle of the comparative angles, $\Delta Aq$ represents an angle comparative error, $R(x)$ represents an x-th comparative result of the comparative results, and b represent a value of the third comparative result.

* * * * *